United States Patent
Neumann et al.

(10) Patent No.: US 12,085,157 B1
(45) Date of Patent: Sep. 10, 2024

(54) VARIATOR AND VARIATOR SHAFT

(71) Applicant: Deere & Company, Moline, IL (US)

(72) Inventors: Clayton P. Neumann, Cedar Falls, IA (US); Kevin R. King, Waterloo, IA (US); David Mueller, Dettenheim (DE); Thomas G. Ore, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/321,061

(22) Filed: May 22, 2023

(51) Int. Cl.
  *F16H 37/08*   (2006.01)
  *F16H 3/72*   (2006.01)

(52) U.S. Cl.
  CPC ............. *F16H 37/086* (2013.01); *F16H 3/72* (2013.01); *F16H 2037/0886* (2013.01); *F16H 2200/2005* (2013.01)

(58) Field of Classification Search
  CPC .. F16H 37/086; F16H 2200/2005; F16H 3/72; F16H 2037/0886
  USPC .......................................................... 475/214
  See application file for complete search history.

(56) References Cited

U.S. PATENT DOCUMENTS

| | | | | |
|---|---|---|---|---|
| 3,822,765 A * | 7/1974 | Heller | ..................... | B62D 11/08 180/6.7 |
| 4,025,136 A | 5/1977 | Ballendux | | |
| 4,587,861 A * | 5/1986 | Morishita | ................ | F02N 15/06 310/83 |
| 4,603,594 A * | 8/1986 | Grimm | ................... | F16H 25/20 188/106 P |
| 4,763,538 A * | 8/1988 | Fujita | ..................... | B62K 23/06 477/181 |
| 10,655,710 B2 | 5/2020 | Rekow et al. | | |
| 10,807,459 B2 | 10/2020 | Kreis et al. | | |
| 11,137,052 B2 | 10/2021 | Ore et al. | | |
| 11,325,459 B2 | 5/2022 | Ore | | |
| 11,396,231 B2 | 7/2022 | Burjes et al. | | |
| 11,420,512 B2 | 8/2022 | Worley et al. | | |
| 2014/0147068 A1* | 5/2014 | Dunlap | ............... | F16C 33/1065 29/898.054 |
| 2023/0193991 A1* | 6/2023 | Uhkötter | ................... | F02C 7/36 475/159 |

* cited by examiner

*Primary Examiner* — Colby M Hansen
(74) *Attorney, Agent, or Firm* — Tucker Ellis LLP; Michael G. Craig

(57) ABSTRACT

One or more techniques and/or systems are disclosed for a transmission variator. The variator receives input power from at least two power sources and provides variable speed output power paths for the transmission. A variator clutch assembly transfers input power to a variator shaft, which drives a planetary gear assembly, including a sun drive gear, planetary gears, and one or more ring gears. The ring gear(s) provide output power to a high output and low output gear assembly. A double reverse tapered spline between the sun drive gear and sun gear to provide forward thrust on the sun gear. A lubrication pin in the planetary gears can provide pressurized lubrication to the planetary gear assembly. A ring gear retention key can be disposed in a spur gear of the high output gear assembly, and ride in a groove in the underside of the ring gear to provide for alignment.

20 Claims, 10 Drawing Sheets

VARIATOR AND VARIATOR SHAFT

BACKGROUND

Work vehicles, such as those used in the agriculture, construction and forestry industries, and other vehicles, equipment and machinery, may be driven by a power plant which often includes an internal combustion engine or an alternative power source. Power is transferred to the drive wheels through a drivetrain that typically includes a drive shaft, a transmission to provide multiple speeds through various gear ratios, and may include one or more differentials to split power between the two sides of the vehicle. Power may be delivered to one or more axles. The power source, the transmission and the differential are typically packaged in series, with power developed by the engine and/or alternative power sources being delivered through the transmission multi-speed gearing. A variator can be used to sum the power from the engine and other sources to provide variable speed power paths for the transmission.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for an improved variator for a transmission. The variator receives input power from at least two power sources and provides variable speed output power paths for the transmission. The variator receives input power at a clutch assembly, which transfers power to a variator shaft. The variator shaft drives a sun drive gear, which drives a sun gear on a planetary gear assembly. The planetary gear assembly provides output power to a high output and low output gear assembly. Improvements include double reverse tapered spline between the sun drive gear and sun gear to provide forward thrust on the sun gear, to unload a thrust washer. Further, a lubrication pin in the planetary gears can provide pressurized lubrication to the planetary gear assembly and to TRBs in the gear assembly. Additionally, a ring gear retention key can be disposed in a receiving slot of the spur gear of the high output gear assembly. A complementary groove in the underside of the ring gear can provide for appropriate alignment with the key.

In one implementation of a variator for a transmission that receives input power from at least two power sources and provides variable speed output power paths for the transmission, a variator shaft can operably receive input power from a first power source and a second power source. The variator shaft can comprise a first end and a second end. A planetary gear assembly can receive the input power from the variator shaft. The planetary gear assembly comprises a sun gear, a plurality of planet gears, and a ring gear. The ring gear is meshedly engaged with a high output gear assembly that is carried by a high output carrier. Further, a lubrication pin is disposed radially inward from, and in engagement with, the respective planet gears. The lubrication pin comprises a channel that provides pressurized lubrication from an inner portion of a variator to the planet gears.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
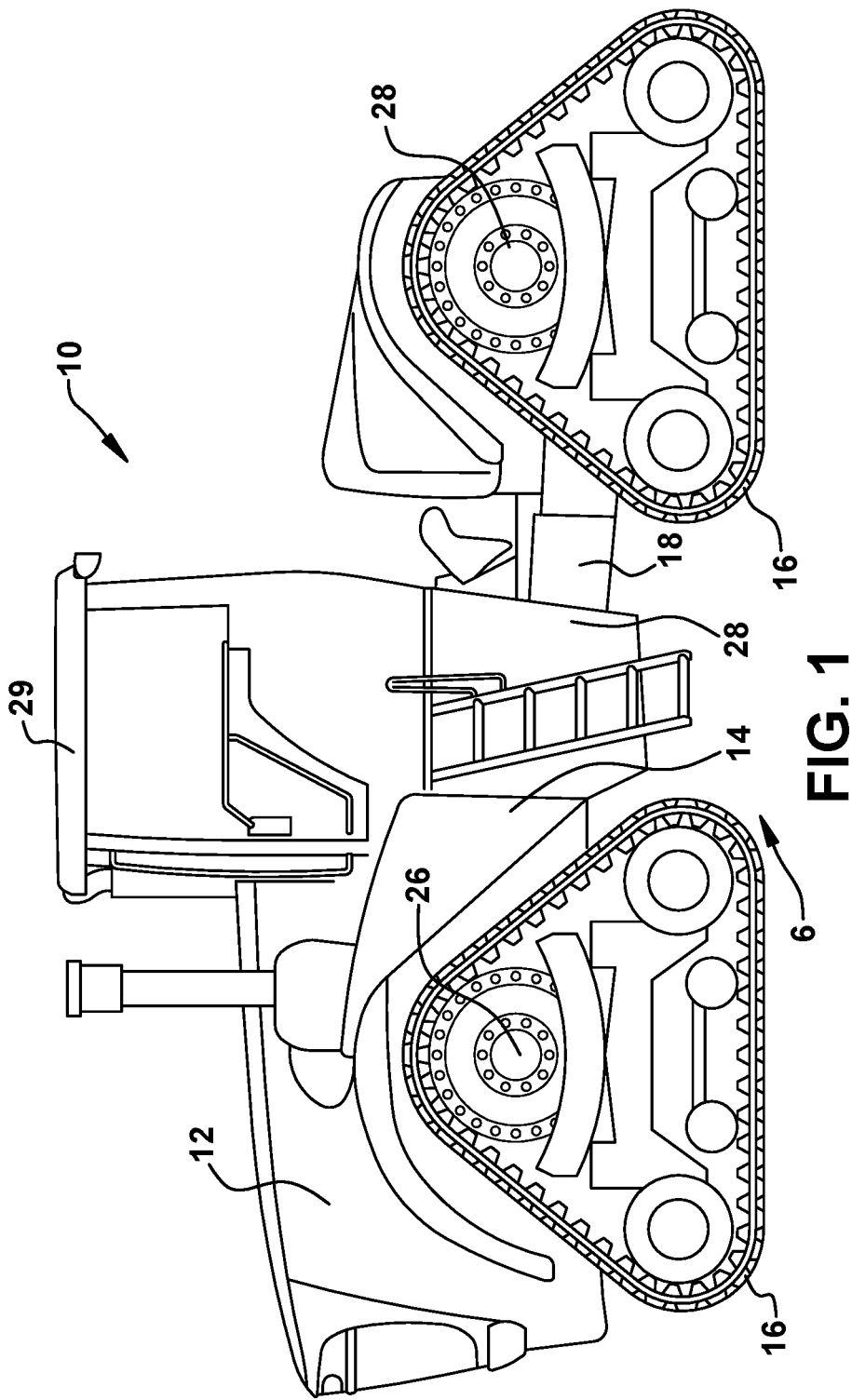
FIG. 1 is a component diagram illustrating one implementation of an example vehicle that may implement one or more systems and methods described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one aspect, in some implementations, power can be provided to a vehicle transmission by both a traditional engine (e.g., an internal combustion engine) and at least one continuously variable power source (CVP) (e.g., an electric motor/generator or hydraulic motor/pump, and so on), and utilize one or more continuously variable machines (CVMs) to provide useful power to an output member (e.g., output shaft). For example, a portion of engine power may be diverted to drive a first CVM, which may in turn drive a second CVM. Power from the engine and/or the second CVP may be delivered to the output member (e.g., a vehicle axle or other output shaft). The engine, the CVMs, and the output member may be operatively connected via an infinitely or continuously variable transmission (CVT).

A CVT may provide a plurality of different modes. For example, a "split-path" power transmission mode may be provided, in which power from both the engine and a CVP is combined for delivery of useful power to the output member. This is called "split-path" power transmission because it is split between a direct mechanical path from the engine and an infinitely/continuously variable path through one or more CVPs. In additional implementations, useful power may be provided by a CVP but not by the engine (e.g., except to the extent the engine may power the CVP). This may be referred to as "CVP-only" power transmission or series mode. Further, in some implementations, useful power may be provided by the engine (e.g., via various mechanical transmission elements, such as shafts and gears), but not by a CVP. This may be referred to as "mechanical-path" power delivery. As one example, a mechanical; path con comprise a power takeoff (PTO) driven by a hydraulic, mechanical, and/or electric power equipment unit power source on the working vehicle and coupled to the work vehicle engine by various mechanical transmission elements other than the CVP, such as by direct connection.

In some implementations, an engine may provide power via various mechanical (e.g., or other) power transmission elements (e.g., various shafts and gears, and so on) to both a first input component of a variator and an input interface of a first CVP. For example, the variator can comprise a planet carrier of a summing planetary gear set; and the input interface can comprise a splined connection for a rotating shaft. The first CVP (e.g., an electrical or hydraulic machine) may convert the power to a different form (e.g., electrical or hydraulic power) for transmission to a second CVP (e.g., another electrical or hydraulic machine), in order to allow the second CVP to provide rotational power to a second input of the variator (e.g., a sun gear of the summing planetary gear set). For example, the variator can be used to sum the power from the engine and CVM electric machine to provide four variable speed power paths for the transmission. It should be noted that that the term "variator" is a component disposed in or in communication with the transmission, while the "variator shaft" can be used to describe a component of the variator; as such the variator includes the variator shaft.

In one aspect, as described herein, an example transmission comprises an implementation of a variator that may be configured to operate over a plurality of modes that provide variable speed power paths. The example variator includes a number of rotating components, such as shafts, clutches, bearings, and/or other components to implement such operation. In implementations described herein, in this aspect, an improved variator can be configured to provide for merely one adjustment setting for multiple bearings. Further, the improved variator can comprise a ring gear retention key, reverse tapered roller bearings (TRB), and pressure lubrication of the planet pins.

As will become apparent from the discussion herein, the disclosed improved variator and variator shaft may be used to improve a variety of systems and vehicles, and with a variety of machinery. With reference now to the drawings that are illustrating the example implementations without limiting the variator systems and methods. One implementation of the improved variator and shaft may be implemented in a transmission of a tractor, as illustrated in FIG. 1. However, it is to be appreciated that the implementations of the innovation as claimed can nevertheless be applied to any desired operating machine with that utilizes a transmission, such as various kinds of tractors, harvesters, log skidders, graders, construction equipment, or various other work vehicle types and construction equipment, and the like.

FIG. 1 is a component diagram illustrating an example implementation of a working vehicle 10 in a side view, where one or more portions of the innovations described herein may be implemented. In this example, the working vehicle 10 is an agricultural vehicle in the form of a tractor, the fundamentals of which are known to the person skilled in the art. However, a working vehicle 10 in the sense of the disclosed innovation may be any vehicle that may be used for construction work or for agricultural work such as, or the like. A typical working vehicle 10 comprises a driver cabin 4 for occupation by an operator. In some implementations, the cabin 4 can be fitted with one or more operator interfaces, such as controls, user interfaces on a screen, and the like. The operator interface may be used to control the vehicle 10 and implements if attached, to perform a target task.

One example application involves an engine power delivery system that may be included in the work vehicle 10, which in this example is depicted as a tracked, articulated agricultural tractor. It will be understood that the disclosed engine power delivery system may also be used in non-work vehicles where engine power outputs exceed transmission capacity, or exceed the desire to route power through the transmission.

In the current example, the work vehicle 10 is designed as a high capacity pulling machine that efficiently delivers a very high level of power to the ground 6 and is built for pulling power. In general, the work vehicle 10 includes an engine 12 that delivers high horsepower, and includes a multi-speed (e.g. 18 forward gears) electronically controlled transmission 14 configured in a known manner. The available power from the engine 12 may be higher than the power rating of the transmission 14. The work vehicle 10 includes a drive system with four track sets 16, providing a high level of traction to transfer maximum power to the ground for pulling the heaviest of loads and for making easy work of applications like cultivating, ploughing, ripping and planting. In other examples, the track sets 16 may be replaced by wheels. Delivering such a high level of horsepower requires driveline components capable of handling the load. To avoid the need to redesign all driveline components, in particular the long lead time and costly transmission 14, or for other reasons to bypass the transmission 14, the current disclosure delivers the engine power through a bifurcated delivery system.

The work vehicle 10 has a main chassis 18 that in this example is articulated at a joint 20 to assist with maneuverability. The joint 20 connects a front unit 22 with a rear unit 24. The chassis 18 is supported by the track sets 16, which engage the ground. The track sets 16 support the chassis 18 through axle assemblies 26, 28. Two or more of the track sets 16 may be powered for propelling the work vehicle 10, and in this example all four track sets 16 are powered. The chassis 18 supports the engine 12, which serves as a power plant for generating power, and which in this example is in the form of an internal combustion engine. An operator cabin 29 is provided in which operator interface and control means (e.g., various controls wheels, levers, switches, buttons, screens, keyboards, etc.) are stationed. The work vehicle 10 may be configured to use and/or to provide to other connected equipment, power from the engine 12 to generate electric power and/or to drive mechanical, fluid powered, and/or other functions. In the current example, the axle assemblies 26, 28 are provided with supplemental power from the engine 12 in the form of electric power and the vehicle 10 includes supporting systems and equipment for delivering the electric power as further described below. Further, the variator 28, described herein, can be disposed in or operably coupled with the transmission 14 to provide power output.

Generally, a powertrain of a vehicle 10 can include the engine 12, transmission 14 (including the variator 28), and other shafts and gear systems. In this example, the powertrain generates power and transmits the power from one or more power sources (e.g., engines, motors, and/or other power sources, as discussed below) to an output member (e.g., an output shaft). In some implementations, the powertrain may transmit the power to rear and/or front axles 26, 28 of the work vehicle 10. The powertrain may further be configured to deliver power to a power take-off shaft for powering an implement that is supported on the vehicle 10 or that is supported on a separate vehicle. It will be appreciated that the powertrain may be configured for delivering power to other power sinks without departing from the scope of the present disclosure.

Figure 2:
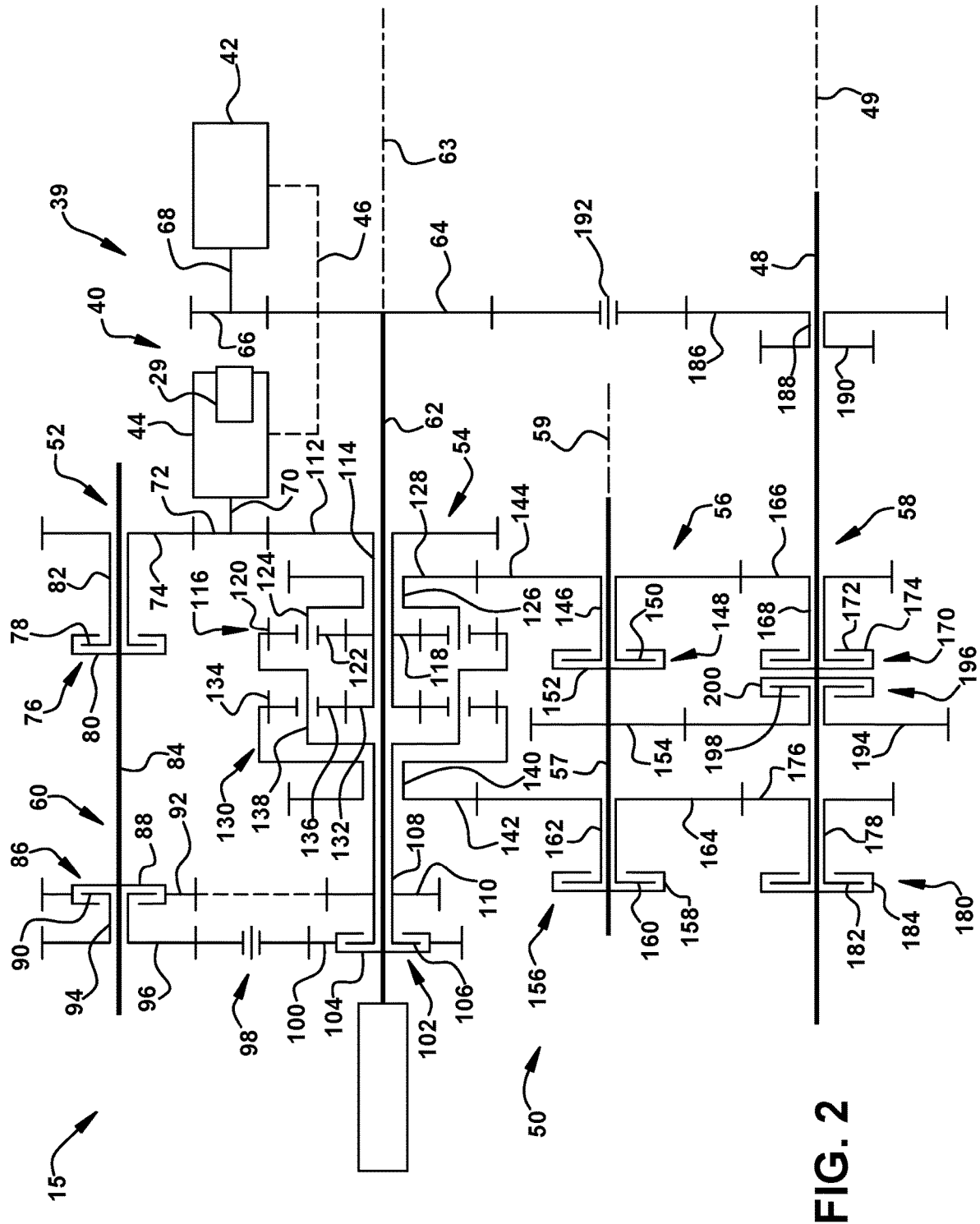
FIG. 2 is a schematic diagram illustrating one implementation of an example drive train and transmission system, as described herein.

FIG. 2 is a schematic diagram illustrating one example implementation of a powertrain 15, implementing an improved variator and shaft, as described herein. The powertrain 15 may include an engine 38, which may be an internal combustion engine of various known configurations. The powertrain 15 may also include a primary power equipment unit 39 in the form of a continuously variable power source (CVP) 40. The CVP 40 may include at least one continuously variable machine (CVM), such as an electrical machine or a hydraulic machine. In the implementation shown, the CVP 40 includes a first CVM 42 and a second CVM 44. In this implementation, a first CVM 42 may be operably connected to a second CVM 44 via a conduit 46, such as one or more electrical wires or a fluid conduit. In one implementation, the first CVM 42 may be an electric generator operably connected to the second CVM 44 in the form of an electric motor via an electrical conduit 46, such as one or more electrical wires.

In one example implementation, a primary power equipment torque sensor 29 generates a primary power equipment torque signal indicative of torque delivered to the transmission by the primary power equipment unit second CVM 44, in the form of an electric motor for example. In another implementation the first CVM 42 may be a hydraulic pump operably connected to the second CVM 44 in the form of a hydraulic motor via a fluid conduit 46, such as one or more pipes. As an example implementation, the primary power equipment torque sensor 29 is provided for generating the primary power equipment torque signal representative of torque delivered to the transmission by the primary power equipment unit second CVM 44, in the form of a hydraulic motor. In another implementation the first CVM 42 may be a battery operably connected to the second CVM 44 in the form of an electric motor via an electrical conduit 46, such as one or more electrical wires. In an example implementation, a primary power equipment torque sensor 29 generates a primary power equipment torque signal representative of torque delivered to the transmission by the primary power equipment unit second CVM 44, in the form of the electric motor for example.

The powertrain 15 may also comprise an output shaft 48 or other output member defining an output axis 49. The output shaft 48 may comprise or may be directly connected to one or more power sinks (e.g., one or both axles 16, power take-off ("PTO") shafts, etc.) of the vehicle 10. In some implementations, a torque converter or other device may be included between the engine 38 and the output shaft 48 (or another shaft (not shown)), although such a device is not necessary for the operation of the powertrain 15, as contemplated by this disclosure. Further, in certain implementations, multiple shafts (not shown), including various shafts interconnected by various gears or other power transmission components, or equivalent power transmission components (e.g., chains, belts, and so on) may be included.

As noted above, the powertrain 15 may further include a transmission 50 for transferring power between the engine 38, the CVP 40, and the output shaft 48. The transmission 50 may include a plurality of components, such as shafts, gears, gearsets, clutches, brakes, and/or other components that interconnect the engine 38, the CVP 40, and the output shaft 48 as will be discussed in detail below. The transmission 50 may be considered a continuously variable or infinitely variable transmission. Also, the transmission 50 may be configured to provide selection between one of the plurality of transmission modes to vary the speeds and power flow paths.

As illustrated, the engine 38 may provide rotational power to the output shaft 48 via the transmission 50. The engine 38 may also provide rotational power to the first CVM 42 via the transmission 50. Continuing, the first CVM 42 may convert the received power to an alternate form (e.g., electrical or hydraulic power) for transmission over the conduit 46. This converted and transmitted power may be received by the second CVM 44 and then re-converted by the second CVM 44 to provide a rotational power output. Various known control devices (not shown) may be provided to regulate such conversion, transmission, re-conversion and so on.

In some implementations, the first CVM 42 and the second CVM 44 are both electrical machines. Also, in some implementations, the first and/or second CVMs 42, 44 may be configured to operate as a motor (to output mechanical power from electrical input power) and as a generator (to output electrical power from mechanical input power).

Generally, in some implementations, the transmission 50 may include an input assembly 52 with an input shaft 62 to which the engine 38 is mounted and that defines an input or engine axis 63. In this example, the input assembly 52 may further include a further transmission shaft 84, spaced apart from the input shaft 62 and selectively coupled to the input shaft 62, as discussed in greater detail below. The input assembly 52 may include at least one component (an input transmission component) that is supported for rotation to facilitate transmission of power, as discussed below. As will be also discussed below, the engine 38 and the CVP 40 may be operatively connected to the input assembly 52.

The transmission 50 may also include a variator 54, the improved implementation of which is described further below. The variator 54 is at least partially mounted about the input shaft 62 such that, in this example, a central variator axis is coincident with the input axis 63. The variator 54 includes at least one component (a variator component) to facilitate transmission of power from the input assembly 52. In this implementation, the variator 54 is operably connected to the engine 38 and the CVP 40. Generally, the variator 54 may include a variety of devices capable of summing the mechanical inputs from the engine 38 and the CVP 40 for a combined mechanical output to the output shaft 48 for split-path power transmission, for example. In certain implementations, as illustrated, the variator 54 may be configured as summing planetary gearsets (e.g., a double planetary gearset). It will be understood, however, that other configurations may be conceived and configured.

The transmission 50 may further include countershaft assembly 56 with a countershaft 57 defining a countershaft axis 59 and including at least one component (a countershaft component) that is supported for rotation to transfer power from the variator 54. Furthermore, the transmission 50 may include an output assembly 58 with the output shaft 48 and including at least one component (an output component) to transfer power from the countershaft assembly 56 to the output axis 49.

In some implementations, the variator 54 may be disposed between, and operatively connected to, the input assembly 52 and the countershaft assembly 56. Also, the countershaft assembly 56 may be disposed between, and operatively connected to, the variator 54 and the output assembly 58. As such, the transmission 50 may be configured to enable power flow through the transmission 50 along a path from the input assembly 52, through the variator 54 and the countershaft assembly 56, and to the output assembly 58.

Generally, the transmission 50 may be configured as a multi-mode transmission and may provide selective shifting between the different modes. For example, the transmission 50 may provide one or more split-path power transmission modes. In each of these modes, power from the engine 38 and the CVP 40 may be combined or summed (e.g., by the variator 54), and the resulting combined/summed power may be delivered to the output shaft 48. In one split-path mode, the output shaft 48 may be rotated within a first speed range, and in another split-path mode, the output shaft 48 may be rotated within a second speed range. The second speed range may be higher than the first speed range in some implementations. There may be additional split-path modes providing other speed ranges for the output shaft 48 as well.

Additionally, the transmission 50 may provide one or more CVP-only modes. For example, in some implementations, the transmission 50 may, in a sense, disconnect the engine 38 from the output shaft 48 and instead deliver CVP power from the CVP 40 to the output shaft 48. In some implementations, the speed range for the output shaft 48 during a CVP-only mode may be relatively low. For example, the transmission 50 may provide a CVP-only mode at which torque is maintained at the output shaft 48 while the output shaft 48 remains stationary (e.g., angular velocity of zero). This may be referred to as "powered zero". The output shaft 48 may be driven at relatively low speeds (e.g., "creeper speeds") as well in this CVP-only mode.

The transmission 50 may further include a control set 60 with a plurality of selective transmission components for selecting between the different transmission modes. The selective transmission components of the control set 60 may include wet clutches, dry clutches, dog collar clutches, brakes, or other similar components that may selectively move between an engaged position and a disengaged position. More specifically, a representative selective transmission component may include a first member and a second member that may engage each other (i.e., fixedly attach together for rotation as a unit) and, alternatively, disengage from each other (i.e., detach to allow relative rotation between the two). Although not shown, the control set 60 may be connected to a known control system for controlling actuation of the individual transmission components. Accordingly, as will be discussed further, the transmission 50 may provide effective power transmission across myriad modes such that the powertrain 14 is highly efficient.

Accordingly, some components of the transmission 50, in accordance with an example implementation, will now be discussed in detail according to an example implementation. As shown, the engine 38 may be coupled to drive the input (or engine) shaft 62 that is supported for rotation about the input axis 63. A first gear 64 may be fixed for rotation on the input shaft 62 at an end opposite the engine 38. The first gear 64 may be enmeshed with a second gear 66. The second gear 66 may be fixed for rotation on a first CVM shaft 68 connected to the first CVM 42 for delivering mechanical power to the first CVM 42.

The second CVM 44 may be coupled to a second CVM shaft 70. The second CVM shaft 70 may be considered the output shaft of the second CVM 44 and may be driven in rotation about an axis that is spaced apart from and parallel to the input shaft 62, in this implementation. A third gear 72 may be fixed for rotation on the second CVM shaft 70. The third gear 72 may be enmeshed with a fourth gear 74.

The transmission 50 may further include a first clutch 76 of the control set 60. The first clutch 76 may be referred to as a "creeper clutch" in some implementations. The first clutch 76 may include at least one first member 78 and at least one second member 80 (e.g., first and second clutch plates). The first member 78 may be fixed for rotation with a first hollow shaft 82, which in turn supports the fourth gear 74. The second member 80 is fixed for rotation on the transmission shaft 84. The first hollow shaft 82, on which the first member 78 of the first clutch 76 is mounted, may surround and receive a portion of the transmission shaft 84, on which the second member 80 of the first clutch 76 is mounted.

The first clutch 76 may be configured to move between an engaged position in which the first and second members 78, 80 abut and engage, and a disengaged position in which the first and second members 78, 80 are separated from one another. For example, the first member 78 and the second member 80 engage together in the engaged position for rotation as a unit such that the second CVM shaft 70 of the second CVM 44 is rotationally coupled to transmission shaft 84 via the third gear 72, the fourth gear 74, and the first clutch 76. The first member 78 and the second member 80 may disconnect for independent rotation in the disengaged position to, in effect, cut off this power flow path.

The transmission 50 may additionally include a second clutch 86 of the control set 60. The second clutch 86 may be referred to as a "reverse clutch" in some implementations. Like the first clutch 76, the second clutch 86 may include at least one first member 88 and at least one second member 90. The first member 88 of the second clutch 86 may be fixed to the transmission shaft 84 for mutual rotation. Moreover, a fifth gear 92 may be mounted to the first member 88 of the second clutch 86 for mutual rotation as a unit with the transmission shaft 84. The second member 90 may be fixed on an end of a second hollow shaft 94 that receives and circumscribes the transmission shaft 84. A sixth gear 96 is mounted on the second hollow shaft 94 on a side opposite the second member 90 of the second clutch 86.

As above, the second clutch 86 may be configured to move between an engaged position in which the first and second members 88, 90 abut and engage, and a disengaged position in which the first and second members 88, 90 are separated from one another. As such, the second clutch 86 may engage to allow power transmission between the transmission shaft 84 and the sixth gear 96. The first and second members 88, 90 may disengage to cut off this power flow. The sixth gear 96 may be enmeshed with an idler gear 98. The idler gear 98, in turn, may be enmeshed with a seventh gear 100, as discussed below.

The transmission 50 may include a third clutch 102 of the control set 60. The third clutch 102 may be referred to as a "forward clutch" in some implementations. Like the above-described clutches, the third clutch 102 may include at least one first member 104 and at least one second member 106. The first member 104 of the third clutch 102 may be fixed to the seventh gear 100 for rotation about the axis of the input shaft 62. The second member 106 may be fixed to an end of a third hollow shaft 108. The first member 104 and the second member 106 of the third clutch 102 may engage to allow power transmission between the seventh gear 100 and the third hollow shaft 108. The first and second members 104, 106 of the third clutch 102 may disengage to cut off this power transmission path.

Additionally, an eighth gear 110 may be fixed on the third hollow shaft 108. The eighth gear 110 may be enmeshed with the fifth gear 92. The third hollow shaft 108 generally circumscribes the input shaft 62 and includes a first end that forms the second member 106 of the third clutch 102 and a second end that is coupled to the variator 54, as described below. The transmission 50 may include a ninth gear 112 that may be fixed on an end of a fourth hollow shaft 114. The hollow shaft 114 may receive the input shaft 62, and both the ninth gear 112 and the hollow shaft 114 may be supported for selective rotation as a unit relative to the input shaft 62. The ninth gear 112 may be enmeshed with the third gear 72 coupled to the second CVM 44. The fourth hollow shaft 114 may also be operatively attached to the variator 54 as will be discussed.

In this example, the variator 54 may include a double planetary gearset. However, it will be appreciated that the variator 54 may vary from the illustrated implementation without departing from the scope of the present disclosure. Furthermore, it will be appreciated that the variator 54 may include a plurality of variator members, some of which may serve as power inputs and some of which may serve as power outputs, depending on the mode in which the transmission 50 is operating.

In the illustrated implementation, for example, the variator 54 may include a first planetary gearset 116 (a low planetary gearset) having a first sun gear 118, a first ring gear 120, and a plurality of first planet gears 122 with an associated first carrier 124. The first sun gear 118 may be fixed to the shaft 114 for rotation about the variator (and input) axis 55. The first planet gears 122 may be enmeshed with and disposed between the first sun gear 118 and the first ring gear 120. The first planet gears 122 and the first carrier 124 may be configured to rotate together about the variator (and input) axis 55. In addition, the variator 54 may include a first output member formed by a hollow first output member shaft 126 and a tenth (e.g., or first output member) gear 128 mounted on the first output member shaft 126. The first output member shaft 126 receives the hollow shaft 114 and the input shaft 62 and is further fixed to the first carrier 124 for rotation therewith about the variator (and input) axis 55.

Moreover, the variator 54 may include a second planetary gearset 130 (e.g., a high planetary gearset) having a second sun gear 132, a second ring gear 134, and a plurality of second planet gears 136 with an associated second carrier 138. The second sun gear 132 may be fixed to the shaft 114 for rotation about the variator (e.g., and input) axis 55. The second planet gears 136 may be enmeshed with and disposed between the second sun gear 132 and the second ring gear 134. The second planet gears 136 and the second carrier 138 may be configured to rotate together about the variator (e.g., and input) axis 55. The second carrier 138 may also be attached to the first ring gear 120. Likewise, the second ring gear 134 may be centered on and supported for rotation about the so variator (e.g., and input) axis 55. In some implementations, the second carrier 138 may be fixed to the third hollow shaft 108. The opposite portion of the second carrier 138 may be fixed to the first ring gear 120.

The variator 54 may also include a second output member formed by short, hollow second output member shaft 140 and an eleventh (e.g., or second output member) gear 142 mounted on the second output member shaft 140. The second output member shaft 140 is hollow and receives the input shaft 62 and hollow shaft 108. The second output member shaft 140 may be fixed to the second ring gear 134 for rotation therewith about the variator (e.g., and input) axis 55. In some implementations, the second output member gear 142 may be disposed axially between the second planetary gearset 130 and the third clutch 102 with respect to the variator (e.g., and input) axis 55.

It is noted that the first clutch 76, the second clutch 86, and the third clutch 102 may be disposed on an input side of the variator 54. Thus, during operation of the powertrain 14, power (e.g., from the engine 38 and/or the CVP 40) may be input to the variator 54 via one or more of these clutches 76, 86, 102. The variator 54 may output power via the components that are described below.

In this example, the transmission 50 may include a twelfth gear 144. The twelfth gear 144 may be supported for rotation about the countershaft axis 59. For example, the twelfth gear 144 may be fixed on an end of a hollow shaft 146, which is centered on the countershaft axis 59.

Additionally, the transmission 50 may include a fourth clutch 148 of the control set 60. The fourth clutch 148 may be referred to as a "first range clutch" in some implementations. Like the above-described clutches, the fourth clutch 148 may include at least one first member 150 and at least one second member 152. The first member 150 may be fixed to the hollow shaft 146 for rotation about the countershaft axis 59, and the second member 152 may be fixed to the countershaft 57. The countershaft 57 may be received within the hollow shaft 146. The first member 150 of the fourth clutch 148 may engage the second member 152 to allow power transmission from the hollow shaft 146 to the countershaft 57. The first and second members 150, 152 may alternatively disengage to cut off this power transmission path.

The transmission 50 may further include a thirteenth gear 154. The thirteenth gear 154 may be referred to as a "drive gear" in some implementations. The thirteenth gear 154 may be fixed to the countershaft 57 for rotation therewith about the countershaft axis 59. Additionally, the transmission 50 may include a fifth clutch 156 of the control set 60. The fifth clutch 156 may be referred to as a "second range clutch" in some implementations. Like the above-described clutches, the fifth clutch 156 may include at least one first member 158 and at least one second member 160. The first member 158 may be fixed to the countershaft 57 for rotation about the countershaft axis 59. The second member 160 may be fixed to an end of a hollow shaft 162. The second member 160 and the hollow shaft 162 may be supported for rotation about the countershaft axis 59. The first member 158 and the second member 160 of the fifth clutch 156 may engage to allow power transmission from the hollow shaft 162 to the countershaft 57. The first and second members 158, 160 may alternatively disengage to cut off this power transmission path.

The transmission 50 may further include a fourteenth gear 164. The fourteenth gear 164 may be fixed to the hollow shaft 162 on an end that is opposite that of the fifth clutch 156. The fourteenth gear 164 may also be engaged with the second output member gear 142. Additionally, the transmission 50 may include a fifteenth gear 166. The fifteenth gear 166 may be enmeshed with the twelfth gear 144 and may be fixed to one end of a hollow shaft 168. The hollow shaft 168 may receive the output shaft 48. The hollow shaft 168 and the fifteenth gear 166 be centered on the output axis 49 and may be supported for rotation about the output axis 49.

Additionally, the transmission 50 may include a sixth clutch 170 of the control set 60. The sixth clutch 170 may be referred to as a "third range clutch" in some implementations. Like the above-described clutches, the sixth clutch 170 may include at least one first member 172 and at least one second member 174. The first member 172 may be fixed to the hollow shaft 168 for rotation about the output axis 49. The second member 174 may be fixed to the output shaft 48. The first member 172 of the sixth clutch 170 may engage the second member 174 to allow power transmission from the hollow shaft 168 to the output shaft 48. The first and second members 172, 174 may alternatively disengage to cut off this power transmission path.

The transmission 50 may further include a sixteenth gear 176. The sixteenth gear 176 may be enmeshed with the fourteenth gear 164. The sixteenth gear 176 may also be fixed to a hollow shaft 178, which may be centered on the output axis 49 and which may be supported for rotation about the output axis 49. The hollow shaft 178 may receive the output shaft 48. Additionally, the transmission 50 may include a seventh clutch 180 of the control set 60. The seventh clutch 180 may be referred to as a "fourth range clutch" in some implementations. Like the above-described clutches, the seventh clutch 180 may include at least one first member 182 and at least one second member 184. The first member 182 may be fixed to the hollow shaft 178 for rotation about the output axis 49. The second member 184 may be fixed to the output shaft 48. The first member 182 and the second member 184 of the seventh clutch 180 may engage to allow power transmission from the hollow shaft 178 to the output shaft 48. The first and second members 182, 184 may alternatively disengage to cut off this power transmission path.

The transmission 50 may further include a seventeenth gear 186, a hollow shaft 188, and a eighteenth gear 190. The seventeenth gear 186 and the eighteenth gear 190 may be fixed on opposite ends of the hollow shaft 188. The hollow shaft 188 may receive the output shaft 48. The hollow shaft 188, the seventeenth gear 186, and the eighteenth gear 190 may be supported for rotation as a unit about the output axis 49. Also, the seventeenth gear 186 may be enmeshed with the first gear 64, directly or through a nineteenth (or idler) gear 192.

Although not shown, the eighteenth gear 190 may be enmeshed with a gear to drive a power sink, such as a power take-off (PTO) shaft. The eighteenth gear 190 may similarly be enmeshed with a gear to drive one or more power equipment units such as an electrical generator, a hydraulic pump, or the like for indirectly powering one or more consumers or power sinks for electric and/or hydraulic power off-boarding from the transmission 50 as may be necessary and/or desired.

Furthermore, the transmission 50 may include a twentieth gear 194. The twentieth gear 194 may be enmeshed with the thirteenth gear 154. The twentieth gear 194 may also be operatively attached to an eighth clutch 196. Like the above-described clutches, the eighth clutch 196 may include at least one first member 198 and at least one second member 200. The first member 198 may be fixed to the twentieth gear 194 (e.g., via a hollow shaft or otherwise). The first member 198 and the twentieth gear 194 may receive the output shaft 48 and may be supported for rotation about the output axis 49. The second member 200 may be fixed to the output shaft 48. The first member 198 and the second member 200 of the eighth clutch 196 may engage to allow power transmission from the twentieth gear 194 to the output shaft 48. The first and second members 198, 200 may alternatively disengage to cut off this power transmission path.

In some implementations, the control set 60 of the transmission 50 may provide selection between at least two modes chosen from the following group: 1) an all-CVP creeper mode (e.g., including powered-zero); 2) a lower speed split-path field mode; and 3) a higher speed split-path field mode. Each of these may be forward modes for drivingly rotating the output shaft 48 in a forward direction (e.g., for moving the work vehicle 10 forward). The transmission 50 may also provide one or more reverse modes for drivingly rotating the output shaft 48 in a reverse (e.g., opposite direction) (e.g., for moving the work vehicle 10 in reverse).

In one example, the transmission 50 may provide the all-CVP creeper mode (e.g., series mode) when the first, fourth, and eighth clutches 76, 148, 196 are engaged and the second, third, fifth, sixth, and seventh clutches 86, 102, 156, 170, 180 are disengaged. Accordingly, engine power from the engine 38 may be transferred from the input shaft 62 to the first gear 64, to the second gear 66, and to the first CVM 42. The first CVM 42 in the form of an electric generator in an example implementation may convert this mechanical input to electrical output for powering the second CVM 44 in the form of an electric motor in an example implementation. Meanwhile, the second CVM 44 may drive the second CVM shaft 70 and power may be transferred from the third gear 72, to the fourth gear 74, through the first clutch 76, to the transmission shaft 84, across the first member 88 of the second clutch 86, to fifth gear 92, to eighth gear 110, to the shaft 108, through the second carrier 138, and to the first ring gear 120. In addition, CVM power at the third gear 72 may simultaneously transfer to the ninth gear 112, to the hollow shaft 114, and to the first sun gear 118. Accordingly, CVM power from the second CVM 44 may re-combine at the first planet gears 122 to drive the first output member shaft 126 and first output member gear 128. The first output member gear 128 may output this power through the twelfth gear 144, to the hollow shaft 146, through the fourth clutch 148, to the countershaft 57, to the thirteenth gear 154, to the twentieth gear 194, through the eighth clutch 196, and to the output shaft 48. Thus, this mode of the transmission 50 provides power from the CVP 40 to the output shaft 48 and also disconnects the engine 38 from the output shaft 48 (e.g., eliminates the direct mechanical connection of the engine 38 such that the engine 38 is merely powering the generator of the first CVM 42). Thus, in some implementations, useful power may be provided by the CVP 50 but not by the engine 38 directly (e.g., except to the extent the engine drives the CVP 50). This is referred to as "CVP-only" power transmission or series mode.

The transmission 50 may provide a first split-path forward mode when the third, fourth, and eighth clutches 102, 148, 196 are engaged and the first, second, fifth, sixth, and seventh clutches 76, 86, 156, 170, 180 are disengaged. In this mode, engine power from the input shaft 62 may transfer through the third clutch 102, to shaft 108, to the second carrier 138, to drivingly rotate the first ring gear 120. Engine power may also drive the input shaft 62 and power may transfer to the first gear 64, to the second gear 66, to the first CVM shaft 68 in order to drive the first CVM 42. Electrical power may be generated for powering the second CVM 44. Mechanical power from the second CVM 44, via second CVM shaft 70 may drive the third gear 72, and this power may be transferred to the ninth gear 112, and to the shaft 114 in order to drive the first sun gear 118. The variator 54 may sum or combine the engine power (e.g., at the first ring gear 120) and the CVP power (e.g., at the first sun gear 118) and output combined power via the first planet gears 122 and associated first carrier 124 to drivingly rotate the first output member shaft 126 and first output member gear 128. The first output member gear 128 may transfer this power through the twelfth gear 144 to the hollow shaft 146, through the fourth clutch 148, to the countershaft 57, to the thirteenth gear 154, to the twentieth gear 194, through the eighth clutch 196, and to the output shaft 48. In some implementations, the speed of the engine 38 may remain constant and the output speed of the second CVM 44 may vary in this mode.

The transmission 50 may additionally provide a second split-path forward mode when the third, fifth, and eighth clutches 102, 156, 196 are engaged and the first, second, fourth, sixth, and seventh clutches 76, 86, 148, 170, 180 are disengaged. In this mode, engine power from the input shaft 62 may transfer through the third clutch 102, to the shaft 108, and to the second carrier 138 in order to drivingly rotate the second planet gears 136. Engine power from input shaft 62 may also drive the first gear 64, and power may be transferred to the second gear 66, and to the first CVM shaft 68 in order to drive the first CVM 42. Electrical power may be generated for powering the second CVM 44. Mechanical power from the second CVM 44 (e.g., from the second CVM shaft 70) may drive the third gear 72, and this power may be transferred to the ninth gear 112, through the shaft 114, to drive the second sun gear 132. The variator 54 may sum or combine the engine power (at the second planet gears 136) and the CVP power (e.g., at the second sun gear 132) and output combined power via the second ring gear 134 to drivingly rotate the second output member shaft 140. The second output member shaft 140 may transfer this power through the second output member gear 142 to the fourteenth gear 164, through the fifth clutch 156, to the countershaft 57, to the thirteenth gear 154, to the twentieth gear 194, through the eighth clutch 196, and to the output shaft 48. In some implementations, the speed of the engine 38 may remain constant and the output speed of the second CVM 44 may vary in this mode.

Furthermore, the transmission 50 may provide a third split-path forward mode when the third and sixth clutches 102, 170 are engaged and the first, second, fourth, fifth, seventh, and eighth clutches 76, 86, 148, 156, 180, 196 are disengaged. This mode may be substantially the same as the first split-path forward mode discussed above. The power flow path into the variator 54 may be the same, but the flow path out of the variator 54 may be different. Specifically, power at the first output member shaft 126 of the variator 54 may be transferred to the twelfth gear 144, to the fifteenth gear 166, to the hollow shaft 168, through the sixth clutch 170, and to the output shaft 48.

Moreover, the transmission 50 may provide a fourth split-path forward mode when the third and seventh clutches 102, 180 are engaged and the first, second, fourth, fifth, sixth, and eighth clutches 76, 86, 148, 156, 170, 196 are disengaged. This mode may be substantially the same as the second split-path forward mode discussed above. The power flow path into the variator 54 may be the same, but the flow path out of the variator 54 may be different. Specifically, power at the second output member shaft 140 and second output member gear 142 of the variator 54 may be transferred to the fourteenth gear 164, to the sixteenth gear 176, to the hollow shaft 178, through the seventh clutch 180, and to the output shaft 48.

Additionally, the transmission 50 may provide a plurality of reverse modes. In some implementations, there may be a corresponding number of forward and reverse split-path modes. The control set 60 may provide the reverse modes similar to the forward modes discussed above, except that the second clutch 86 is engaged instead of the third clutch 102 in each. For example, a first split-path reverse mode may be provided when the second, fourth, and eighth clutches 86, 148, 196 are engaged and the first, third, fifth, sixth, and seventh clutches 76, 102, 156, 170, 180 are disengaged. Accordingly, engine power from the input shaft 62 may transfer through the seventh gear 100, to the idler gear 98, to the sixth gear 96, to the shaft 94, through the second clutch 86, through fifth gear 92, to the shaft 108, and to the second carrier 138 in order to drivingly rotate the first ring gear 120. Engine power may also drive the input shaft 62, and power may be transferred to the first gear 64, and to the first CVM shaft 68 in order to drive the first CVM 42. Electrical power may be generated for powering the second CVM 44. Mechanical power from the second CVM 44 (e.g., from the second CVM shaft 70) may drive the third gear 72, and this power may be transferred to the ninth gear 112, through the shaft 114, to drive the first sun gear 118. As discussed above, the variator 54 may output combined power via the first planet gears 122 and associated first carrier 124 to drivingly rotate the first output member shaft 126. The first output member shaft 126 may transfer this power through the twelfth gear 144, through the fourth clutch 148, to the countershaft 57, to the thirteenth gear 154, to the twentieth gear 194, through the eighth clutch 196, and to the output shaft 48. The other reverse modes may be provided in a similar fashion.

Thus, the transmission 50 provides a plurality of modes that may be useful in different conditions. The operator may select between these different modes and/or the transmission 50 may automatically shift between these modes to maintain high operating efficiency in a number of different operating conditions.

As described above, the overload protection system 12 operates to monitor the torque within the powertrain 14 and generate torque values associated with one or more components of the transmission 50 and powertrain 14, including the input shaft 62, the output shaft 48, and various other components (e.g., gears, bearings, etc.) within the transmission 50. In one example, the variator 54 can sum power from the engine 38 and one or more CVMs 42, 44 (e.g., electric machines) to provide at least 4 variable speed power paths to the transmission 50.

Figure 3:
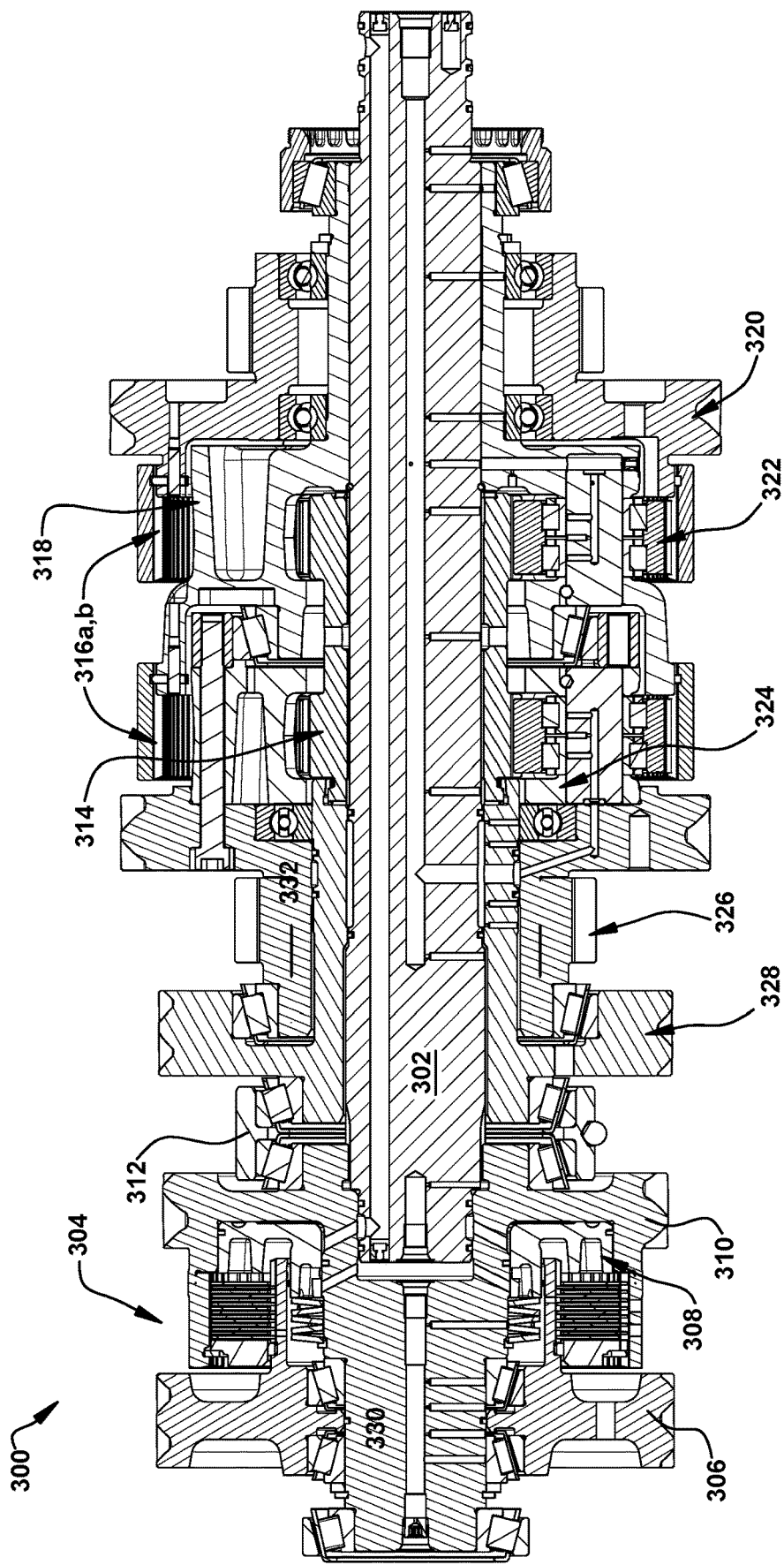
FIG. 3 is a component diagram illustrating one example implementation of a variator and one or more portions of one or more systems as described herein.

FIG. 3 is a component diagram illustrating a side, cut-away view of an example implementation of a variator 300, as described herein. In this implementation, the variator 300 comprises a variator shaft 302. Further, a clutch assembly 304 is disposed forward, and comprises a forward clutch gear 306 and a forward clutch 308, which operably engages a rear clutch gear 310 meshedly engaged with the variator shaft 302. A bearing carrier 312 is disposed between the clutch assembly 304 and a sun drive gear 328. At is rearward end, the sun drive gear 328 meshedly engages a sun drive gear 314. The sun drive gear 314 is meshedly engaged with a plurality of planet gears 322, which are meshedly engaged with a pair of ring gears 316. A high carrier 318 is meshedly engaged with the variator shaft 302 and with a ring gear 316a. A high output gear 320 is carried by the high carrier 318 and meshedly engaged with a ring gear 316b. A low carrier 324 carries a low output gear.

Figure 4A:
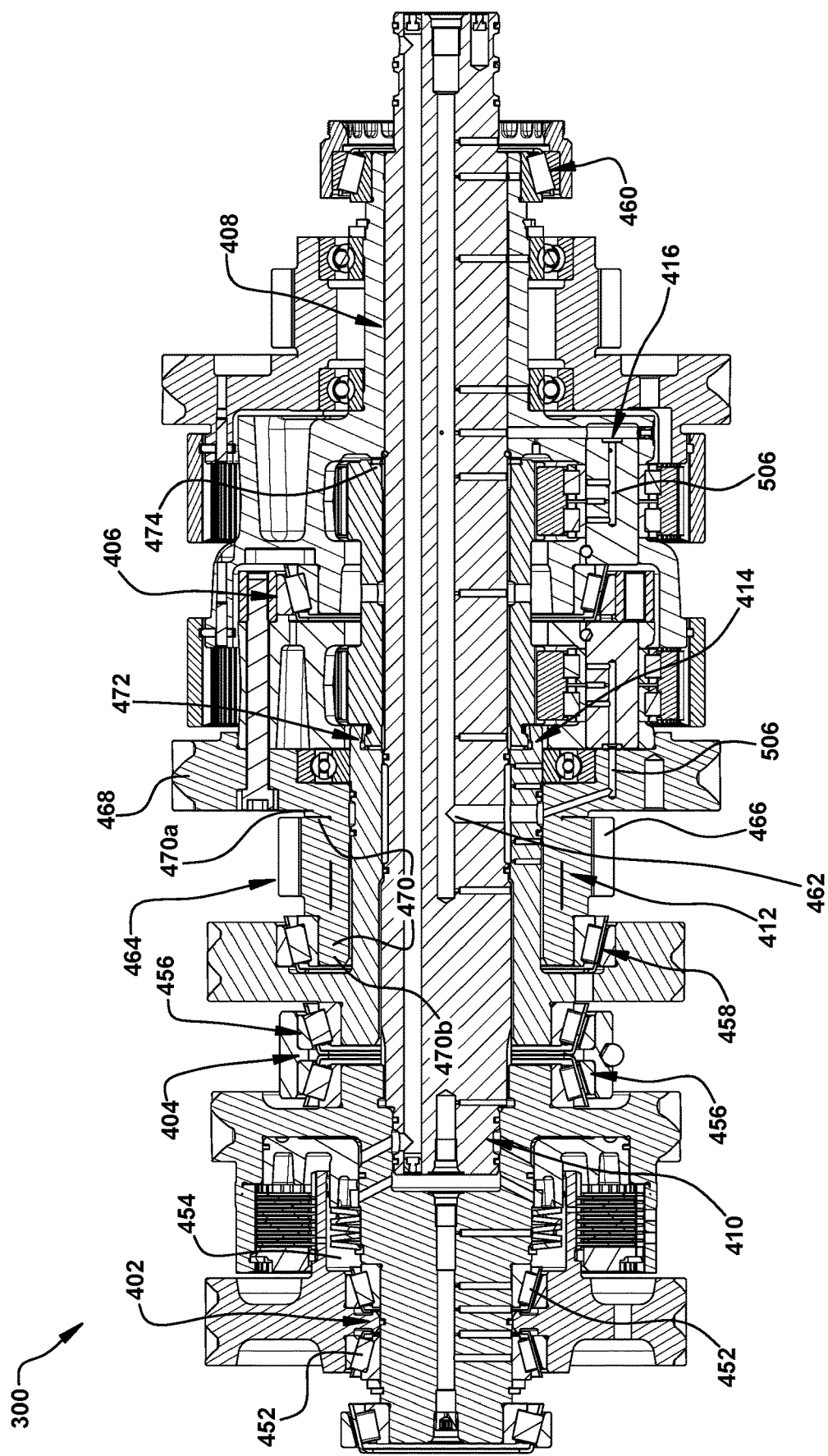
FIG. 4A is a component diagram illustrating one example implementation of a variator and one or more portions of one or more systems as described herein.

With continued reference to FIG. 3, FIG. 4A is a component diagram illustrating a side, cut-away view of the example implementation 400 of the variator 300, as described herein. In this implementation, the variator 300 comprises an integral clutch seal 402. The clutch seal 402 is disposed in a channel in the variator body 330. The clutch seal 402 can be pressurized by fluid, such as oil, to mitigate back flow to the clutch tapered roller bearings (TRB) 452. In this way, the fluid is forced into the clutch cavity 454.

Further, the example variator 300 comprises a shaft pilot 410 disposed at the forward (e.g., first) end of the variator shaft 302. The shaft pilot 410 is configured to handle misalignment of the variator shaft 302 in the variator 300. For example, where the variator shaft 302 may be to long, a larger diameter shaft can be used to support the loads on the shaft 302. The shaft is divided into two sections with the front portion bearing loads, and a mid/rear portion bearing loads. The short pilot 410 placed to handle misalignment.

A double cup carrier 404 is disposed at the front portion of the variator shaft, holding a pair of TRBs. This double cup carrier 404 hold the bearings 456 front to front to help reduce cantilever of the variator shaft 302. For example, a large cantilever can result in misalignment of the shaft 302, and the double cup carrier hold the bearings 456 to help mitigate this cantilever to reduce misalignment.

A double pilot cluster gear weld 412 is used to help the load carry the torque. As illustrated in FIG. 4, a double pilot cluster gear 332 is used to output torque to the shaft 302 in mode 2 using the small spur gear 464, and in mode 4 using the large helical gear 468. The locations of the press fit pilot diameters 470 are shown on either side of the weld 412 in the cluster gear 464. The double pilot 470 creates a larger span to mitigate misalignment of the small spur gear 464 and the large helical gear 468 when the pilots are press-fit together, and welded in place 412. Further, the larger span of the double pilot 470 reduces stress/strain on the weld 412. In this way, for example, the outer right side pilot 470a slips past the inner left side pilot 470b and then when the second set of pilots 470 line up, both sets can be pressed together simultaneously.

Figure 4B:
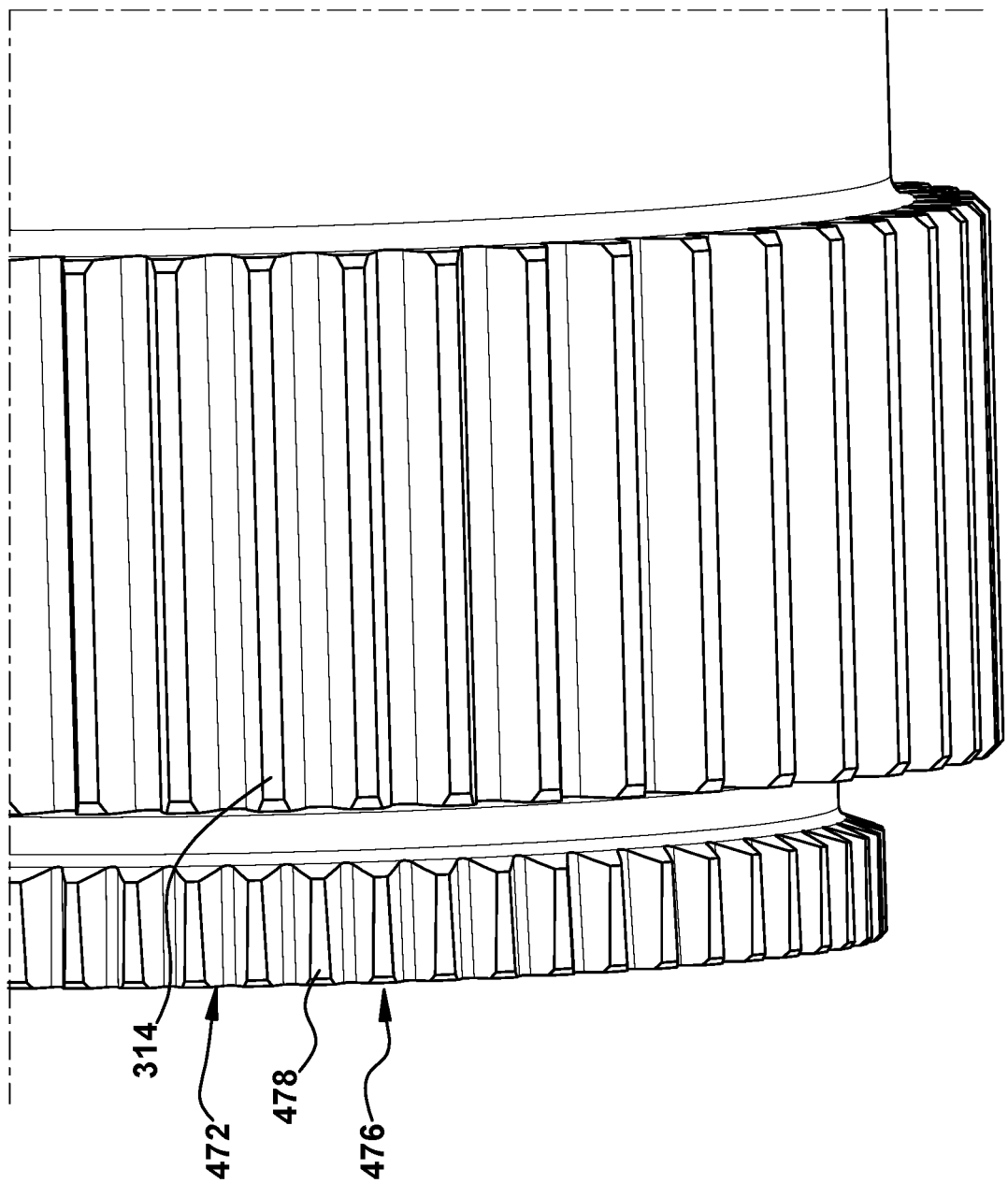
FIG. 4B is a component diagram illustrating one example implementation of a portion of a variator of one or more systems as described herein.

As illustrated in FIGS. 4A and 4B, a reverse TRB is used in at the high carrier 318, disposed with a back taper. A double reverse taper spline 476 on the gear teeth of the spur gear 472 of the sun gear 316 that meshes with the sun drive gear 328 creates a net thrust force to the left in FIG. 4A. This net thrust force draws the sun gear 314 in toward the sun drive gear 328 (to the left) when the spline 476 is carrying torque, in operation. In turn, when the sun gear 314 is drawn toward the sun drive gear 328 the thrust washer is disposed in an unloaded condition, for example, unless the sun gear 314 is in a zero torque/coast condition. In this way, because the thrust washer 474 is usually unloaded, this mitigates thrust washer wear and failure, as axial forces are applied away from the washer 474. As illustrated in FIG. 4B, the spline 476 is formed (e.g., cut) so the tooth 478 is widest at the open face of the gear 472 and tapers back to a smaller width at a closed face of the gear 472. In this implementation, the mating spline of the sun drive gear 328 can also have the same, but complementary shape (reverse taper spline). In this way, the resulting sloped flank can create a new thrust force when under torque.

In this implementation, the high carrier 318 is configured to slide along the variator shaft 302. As an example, the high carrier 318 can be adjusted (e.g., slid) with respect to the shaft 302 by tightening a single fastener, which, in turn, adjusts the respective TRBs (456, 458, 406, 460). That is, in this example, tightening the high carrier 318 can keep the TRBs is a press fit arrangement to mitigate undesired misalignment.

Figure 5A:
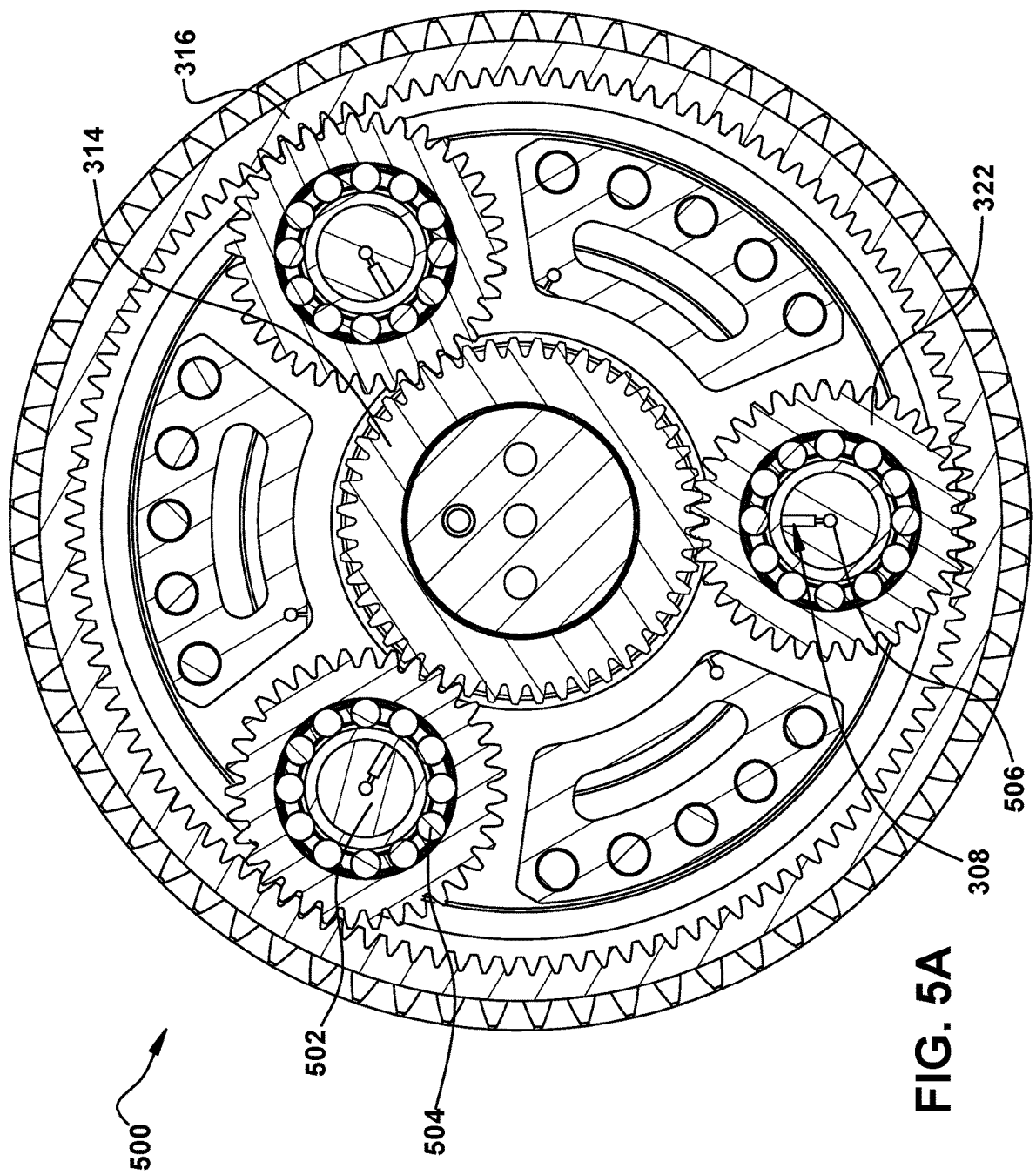
FIGS. 5A and 5B are component diagram illustrating example implementations of one or more portions of one or more systems as described herein.
Figure 5B:
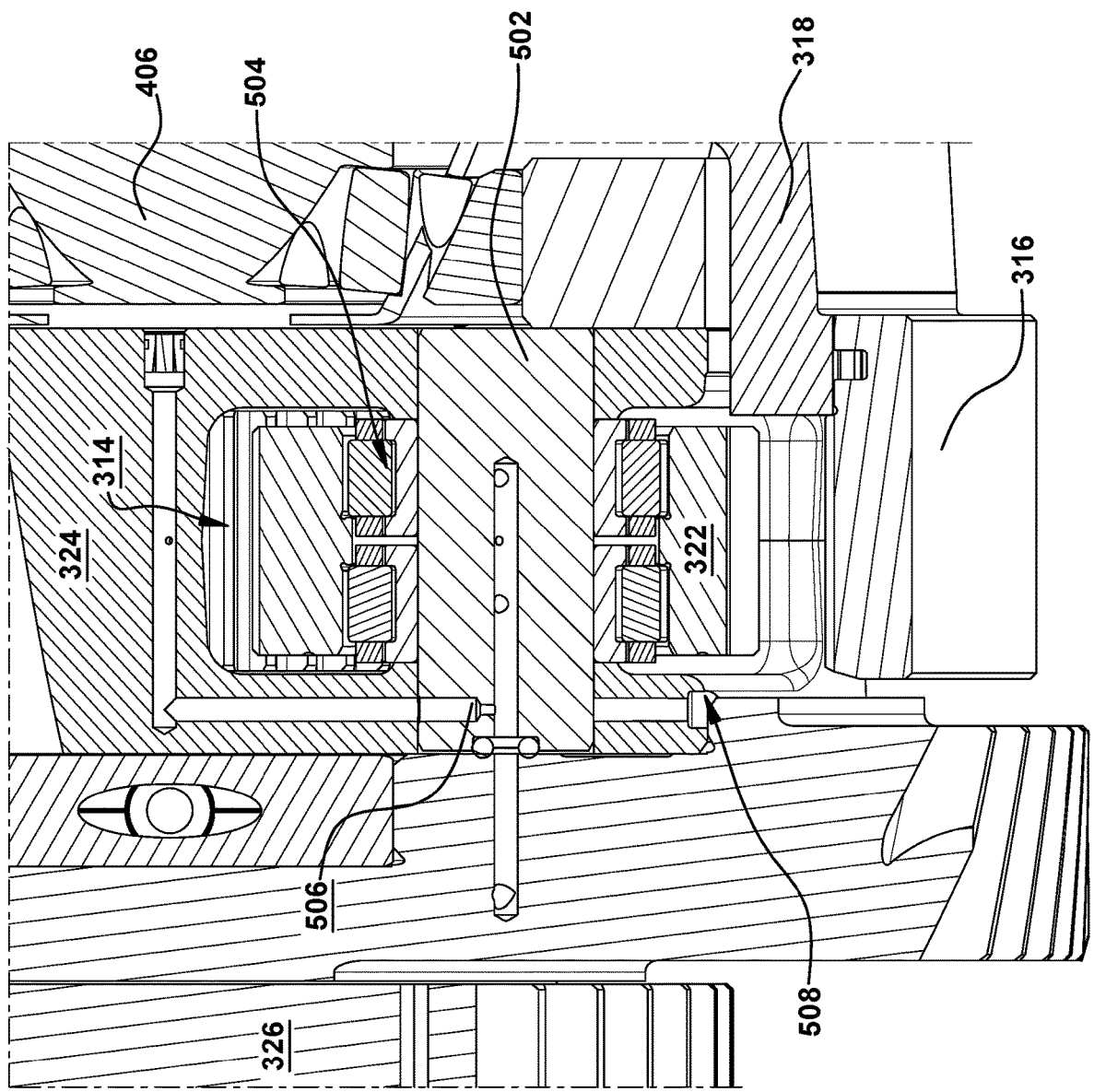

With continued reference to FIGS. 3 and 4A, FIGS. 5A and 5B are component diagrams that illustrate example portions of the variator 300. In one implementation, the variator 300 can comprise pressure lubricated planet pins 416. FIG. 5A illustrates a planetary gear assembly 500 disposed in the variator 300. The planetary gear assembly 500 comprises the sun gear 314, a ring gear 316, and a plurality of planet gears 322. FIG. 5B illustrates a portion of the planetary gear assembly 500 in cut-away side view.

In FIGS. 5A and 5B, a planet gear 322 is disposed on a planet gear pin 502 (e.g., axle) with planet gear bearings 504 disposed therebetween. A planetary gear lubrication channel 506 is fluidly coupled between the low gear assembly 326, the planet gear pin 502, through the low carrier 324 to the TRBs 406, and to a location of the meshed engagement 508 of the planet gears 322. As illustrated in FIG. 4, the planetary gear lubrication channel 506 can be fluidly coupled with a variator shaft lubrication channel 462, which provides pressurized lubricating fluid (e.g., oil) to the planetary gear lubrication channel 506. Further, as illustrated, the planetary gear lubrication channel 506 can provide fluid to the respective planet gear bearings 504, and to the reversed TRBs 406. In this way, for example, pressurized lubrication is provided to the meshed engagement of the planet gears 322 and to the respective bearings 404, 504. For example, lubrication provided to the meshed engagement location 508 can provide for transfer of the lubrication to the planet gears' engagement with the sun gear 314, and with the ring gears 316.

Figure 6A:
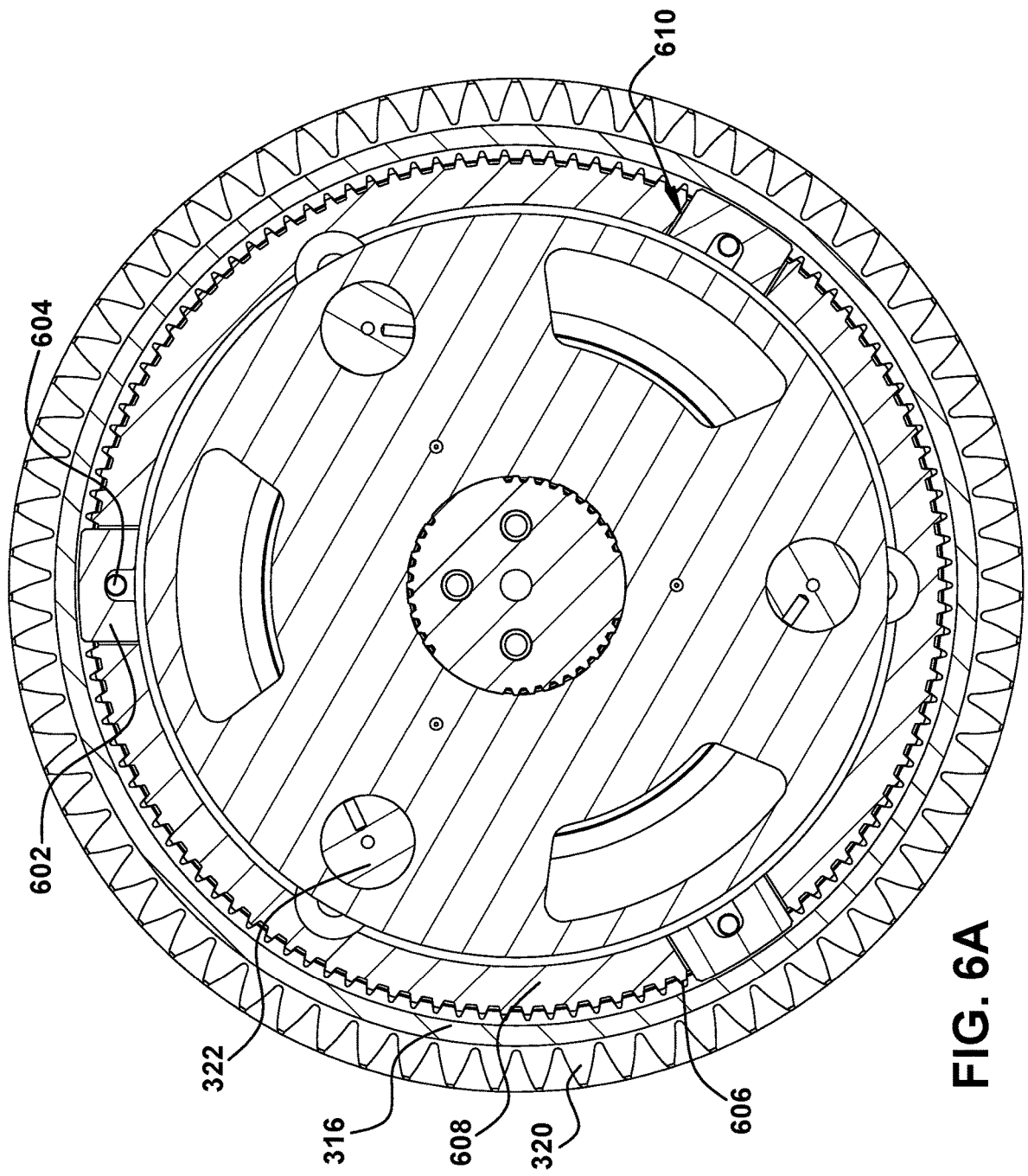
FIGS. 6A, 6B, and 6C are component diagram illustrating example implementations of one or more portions of one or more systems as described herein.
Figure 6B:
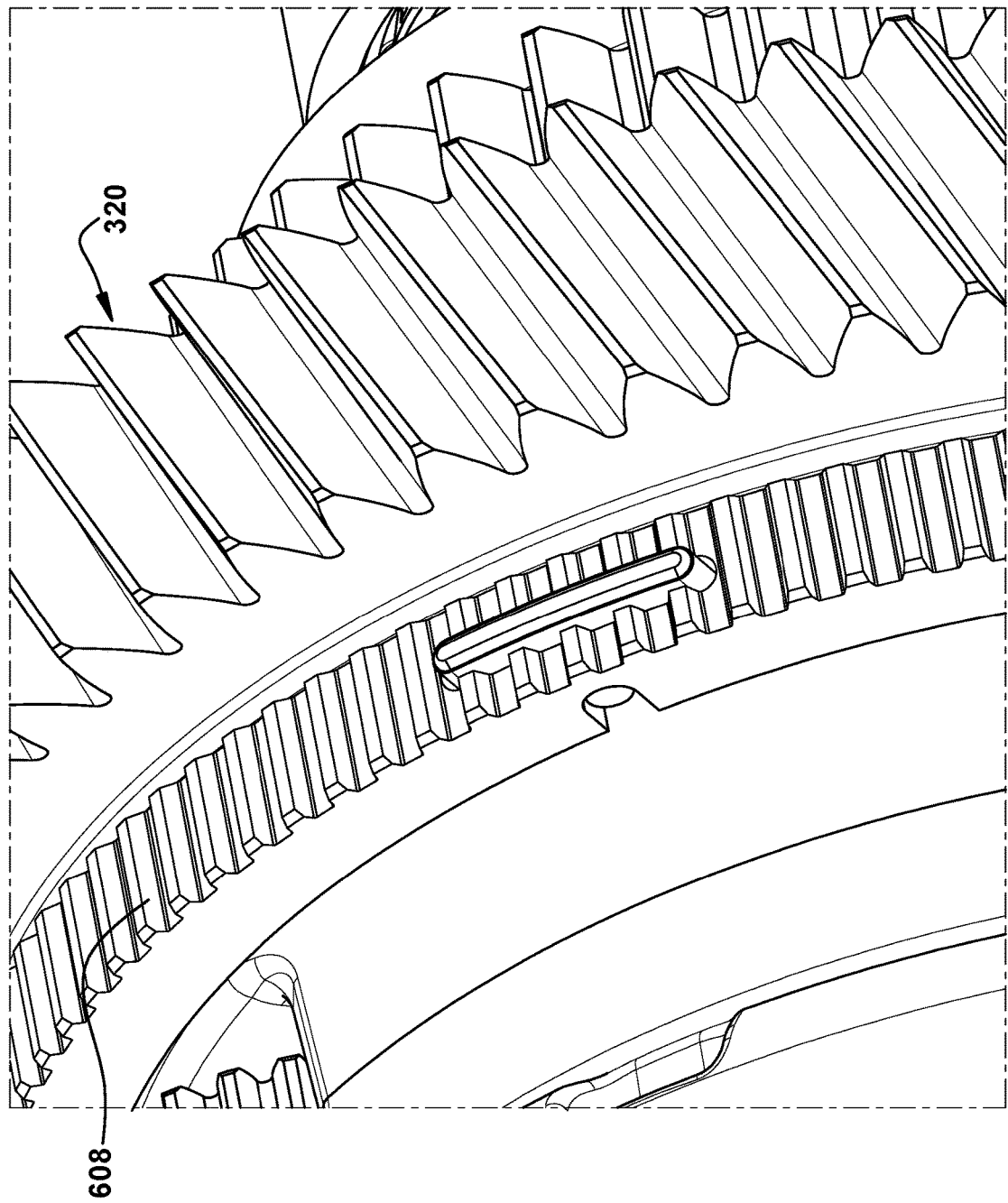
Figure 6C:
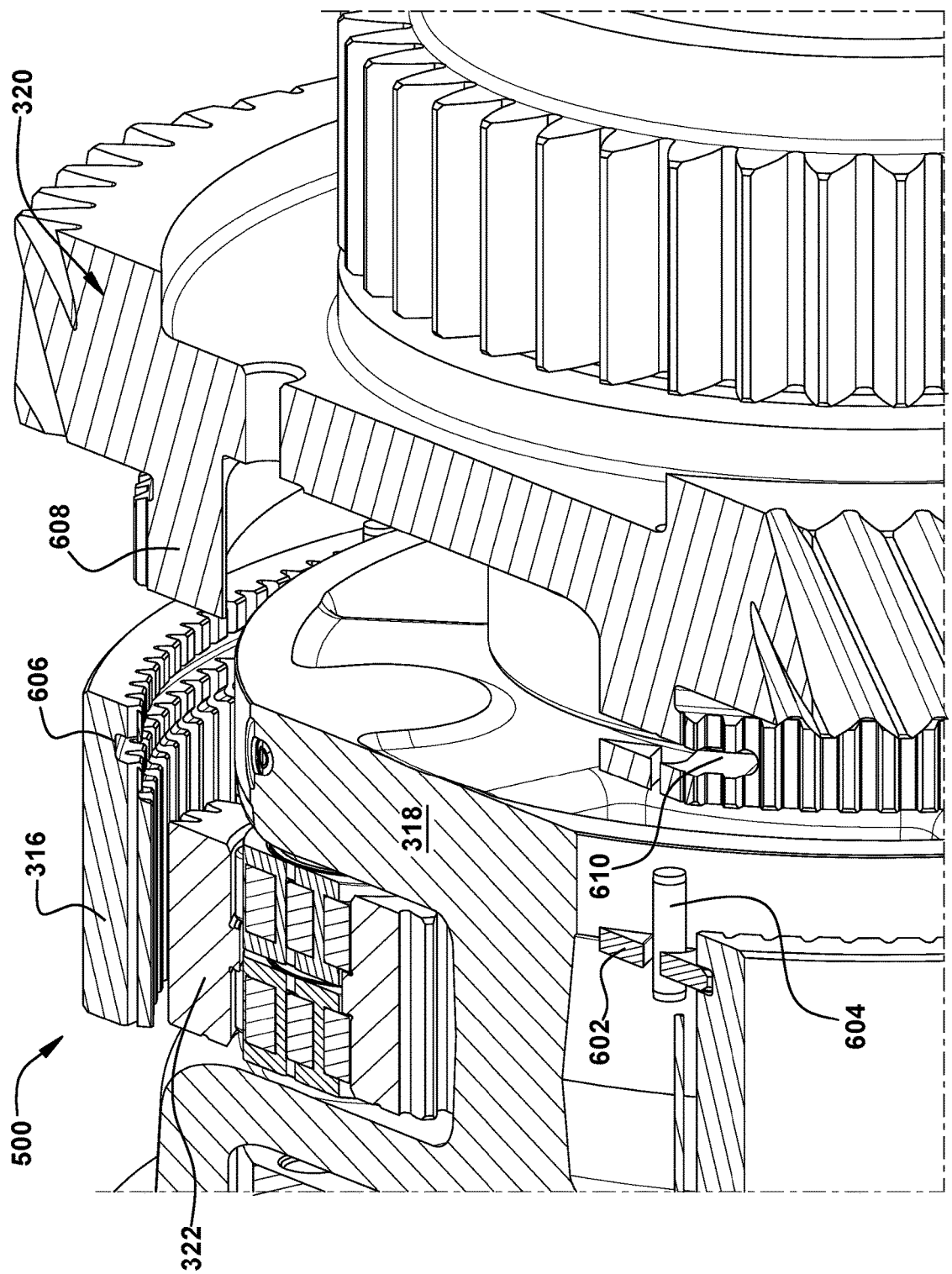

With continued reference to FIGS. 3 and 4A, FIGS. 6A and 6B are component diagrams that illustrate example portions of the variator 300. In this example, in FIG. 6A, one of the ring gears 316 is illustrated in a side view, along with the high output gear 320, the planet gears 322, and the sun gear 314. FIG. 6B illustrates a closeup, perspective view of a portion of the high output gear assembly 320, comprising a high output spur gear 608. As illustrated, the high output gear assembly 320 comprises the spur gear 608 that operably, is meshedly engaged with the ring gear 316 to drive the high output gear 320. FIG. 6C illustrates a partially exploded, perspective view of a portion of the high output gear assembly 320 and planetary gear assembly 500.

As illustrated in FIGS. 6A, 6B, and 6C, a retention key or clip 602 is held in place in a key slot 610 in the high output spur gear 608. In this example, a set of three retention clips 602 are disposed in the spur gear 608; however, it is anticipated that more or less may be used depending on a size and load on the high output gear 320. The retention key 602 has a top or dorsal portion that extends above a top circumference of the spur gear 608. Further, a key channel 606 is disposed around the inner circumference of the ring gear 316. The key channel 606 is configured to engage with the retention key 602, such that the retention key 602 rides in the channel 606 during operation. In this way, the ring gear 316 and high output assembly 320 can be maintained in alignment, and held in place. This arrangement of the retention clip 602, key retention pin 604 in the key slot 610, along with the ring gear key channel 606, can replace the use of snap rings that are presently used in these gear arrangements.

Described implementations of the subject matter can include one or more features, alone or in combination.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A variator for a transmission, the variator receiving input power from at least two power sources and providing variable speed output power paths for the transmission, comprising:
   a variator shaft operably receiving input power from a first power source and a second power source, wherein the variator shaft comprises a first end and a second end, and
   a planetary gear assembly receiving the input power from the variator shaft, and comprising a sun gear, a plurality of planet gears, and a ring gear, the ring gear meshedly engaged with a high output gear assembly that is carried by a high output carrier; and
   a lubrication pin disposed radially inward from, and in engagement with, the respective planet gears, wherein the lubrication pin comprises a channel providing pressurized lubrication from an inner portion of a variator to the planet gears.

2. The variator of claim 1, wherein the sun gear comprises a spur gear that meshedly engages with a sun drive gear engaged with the variator shaft, wherein the spur gear comprises a double reverse-tapered spline on the gear teeth that operably generates a net thrust force toward the first end of the variator shaft.

3. The variator of claim 2, further comprising a thrust washer disposed at an opposite end of the sun gear from the engagement with the sun drive gear, wherein the thrust washer is operably disposed in an unloaded condition.

4. The variator of claim 2, wherein the gear teeth of the sun drive gear engagement with the spur gear of the sun gear comprises a double reverse-tapered spline, and wherein the meshed engagement of the spur gear and sun drive gear operably draws the sun gear laterally toward the first end of the variator shaft.

5. The variator of claim 1, further comprising a reverse tapered roller bearing (TRB) disposed in engagement with the high output carrier.

6. The variator of claim 1, wherein the lubrication pin is fluidly coupled an inner variator shaft cavity to provide lubrication to bearings of the planet gear.

7. The variator of claim 6, wherein the lubricator pin is further fluidly coupled with a TRB disposed in the planetary gear assembly to provide pressurized lubrication.

8. The variator of claim 6, wherein the lubricator pin is further fluidly coupled with a gear surface of the planetary gear to provide lubrication to the meshing surface between the planetary gear and the ring gear, and the planetary gear and the sun gear.

9. The variator of claim 1, further comprising a ring gear retention key disposed in a key slot in a spur gear of the high output gear assembly.

10. The variator of claim 9, wherein the retention key is held in place with a retention pin disposed in a pin channel in the spur gear of the high output gear assembly.

11. The variator of claim 9, wherein the retention key comprises a dorsal portion that operably extends above a surface of the spur gear of the high output gear assembly, and wherein the dorsal portion is configured to be slidably disposed in a key channel in an inner circumference of the ring gear to align the ring gear during rotation.

12. The variator of claim 1, further comprising an integral clutch seal disposed in a channel in a body of the variator, wherein the clutch seal is operably pressurized by fluid to mitigate back flow to clutch TRBs.

13. The variator of claim 1, wherein the variator comprises a shaft pilot disposed at the first end of the variator shaft, and wherein the shaft pilot is seated in a body of the variator proximate a clutch assembly, and is configured to mitigate misalignment of the variator shaft.

14. The variator of claim 1, further comprising a double pilot cluster weld disposed in a double pilot cluster gear that is used to output torque to the variator shaft, wherein the double pilot cluster weld is disposed between press fit pilot diameters to fix the double pilot cluster gears together.

15. The variator of claim 1, wherein the high carrier is configured to be slidable along the variator shaft, and wherein adjustment of a single fastener slides the high carrier along the variator shaft to adjust pressure applied to a plurality of TRBs in the variator.

16. A variator for a transmission, the variator comprising a first end and second end, a variator shaft that operably receives input from at least two power sources, and a planetary gear assembly that receives power from the variator shaft to provide output power for variable speed output power paths for the transmission, comprising:

a high output gear assembly that is carried by a high output carrier, wherein the high output gear assembly receives power from a ring gear disposed in the planetary gear assembly; and the planetary gear assembly comprising a sun gear, wherein the sun gear comprises a spur gear that engages with and receives power from a sun drive gear that is engaged with and receives power from the variator shaft, wherein the spur gear comprises a double reverse-tapered spline on its gear teeth, and wherein the sun drive gear comprises a double reverse-tapered spline on its gear teeth, wherein the meshed engagement of the spur gear and sun drive gear operably generating a net thrust force on the sun gear toward the first end of the variator away from the opposite second end of the variator.

17. The variator of claim 16, further comprising a thrust washer engaging the sun gear and high carrier toward the second end of the variator, wherein the thrust washer operably disposed in an unloaded condition when the net thrust force on the sun gear is toward a first end.

18. The variator of claim 16, wherein the planetary gear assembly comprises one or more of planet gears, respectively comprising a lubrication pin about which the planet gear rotates, and wherein the lubrication pin comprising a channel is fluidly coupled with an inner variator shaft cavity and with the planet gear to provide pressurized lubrication, and to provide pressurized lubrication to a meshed engagement between the planet gear and the ring gear, and the planet gear and the sun gear.

19. The variator of claim 16, further comprising a ring gear retention key disposed in a key slot in a spur gear of the high output gear assembly, wherein the retention key held in place with a retention pin disposed in a pin channel in the spur gear of the high output gear assembly, wherein the retention key comprises a dorsal portion that operably extends above a surface of the spur gear of the high output gear assembly, wherein the dorsal portion configured to be slidably disposed in a key channel in an inner circumference of the ring gear to align the ring gear during rotation.

20. A variator for a transmission, the variator receiving input power from at least two power sources and providing variable speed output power paths for the transmission, comprising:

a variator shaft operably receiving input power from first power source and a second power source, wherein the variator shaft comprising a first end and a second end, and a planetary gear assembly receiving the input power from the variator shaft, and comprising a sun gear, a plurality of planet gears, and a ring gear, wherein the ring gear meshedly engages with a high output gear assembly that is carried by a high output carrier, wherein the sun gear comprises a spur gear that meshedly engages with a sun drive gear engaged with the variator shaft, and wherein the spur gear comprises a double reverse-tapered spline on the gear teeth that operably generates a net thrust force toward the first end of the variator shaft;

a lubrication pin disposed radially inward from, and in engagement with, the respective planet gears, wherein the lubrication pin comprising a channel providing pressurized lubrication from an inner portion of a variator to the planet gears; and a ring gear retention key disposed in a key slot in a spur gear of the high output gear assembly, wherein the retention key is held in place with a retention pin disposed in a pin channel in the spur gear of the high output gear assembly, wherein the retention key comprises a dorsal portion that operably extends above a surface of the spur gear of the high output gear assembly, wherein the dorsal portion is configured to be slidably disposed in a key channel in an inner circumference of the ring gear to align the ring gear during rotation.

* * * * *